(12) United States Patent
He et al.

(10) Patent No.: US 8,871,870 B2
(45) Date of Patent: Oct. 28, 2014

(54) SYNTHESIZED RESINS AND VARNISHES AND PREPEGS AND LAMINATES MADE THEREFROM

(71) Applicant: Isola USA Corp., Chandler, AZ (US)

(72) Inventors: Guroen He, Chandler, AZ (US); Tarun Amla, Chandler, AZ (US); Larry D. Olson, Viroqua, WI (US); Peggy Conn, Chandler, AZ (US)

(73) Assignee: Isola USA Corp., Chandler, AZ (US)

( * ) Notice: Subject to any disclaimer, the term of this patent is extended or adjusted under 35 U.S.C. 154(b) by 0 days.

(21) Appl. No.: 13/840,056

(22) Filed: Mar. 15, 2013

(65) Prior Publication Data

US 2014/0011962 A1 Jan. 9, 2014

Related U.S. Application Data

(63) Continuation of application No. PCT/US2013/022549, filed on Jan. 22, 2013.

(60) Provisional application No. 61/588,528, filed on Jan. 19, 2012.

(51) Int. Cl.
*C08C 19/22* (2006.01)
*C09D 153/02* (2006.01)
*C08F 36/06* (2006.01)
*C09D 147/00* (2006.01)
*C08F 271/02* (2006.01)
*C08K 5/00* (2006.01)
*C08F 36/04* (2006.01)
*C09D 109/00* (2006.01)
*C09D 109/06* (2006.01)

(52) U.S. Cl.
CPC ........... *C09D 153/02* (2013.01); *C08F 2810/20* (2013.01); *C08F 36/06* (2013.01); *C08C 19/22* (2013.01); *C09D 147/00* (2013.01); *C08F 271/02* (2013.01); *C08K 5/00* (2013.01); *C08F 36/04* (2013.01); *C09D 109/00* (2013.01); *C09D 109/06* (2013.01)
USPC ............. 525/282; 525/296; 525/232; 526/82; 526/84

(58) Field of Classification Search
None
See application file for complete search history.

(56) References Cited

U.S. PATENT DOCUMENTS

| | | | |
|---|---|---|---|
| 7,090,924 B2 | 8/2006 | Sharma | |
| 2006/0019077 A1* | 1/2006 | Hopper et al. | 428/209 |
| 2007/0077413 A1 | 4/2007 | Amou et al. | |
| 2008/0038528 A1 | 2/2008 | Paul | |
| 2009/0178832 A1* | 7/2009 | Amou et al. | 174/258 |
| 2009/0191387 A1 | 7/2009 | Paul | |
| 2009/0292050 A1* | 11/2009 | He et al. | 524/404 |
| 2010/0129676 A1* | 5/2010 | Fujimoto et al. | 428/462 |
| 2010/0233495 A1 | 9/2010 | Mizuno | |

FOREIGN PATENT DOCUMENTS

WO WO97/38564 10/1997

* cited by examiner

*Primary Examiner* — Robert C Boyle
(74) *Attorney, Agent, or Firm* — McDonnell Boehnen Hulbert & Berghoff LLP

(57) ABSTRACT

Synthesized base resin compositions that include a raw resin and a maleimide and/or bismaleimide monomer as well as compounded varnishes that include a raw resin or synthesized base resin as well as a monomer, flame retardant and initiator as well as prepregs and laminates made using the synthesized base resin and compounded varnishes.

21 Claims, No Drawings

SYNTHESIZED RESINS AND VARNISHES AND PREPEGS AND LAMINATES MADE THEREFROM

This application is a continuation of PCT/US13/022549 filed on Jan. 22, 2013 which in turn claims priority to U.S. provisional patent application No. 61/588,528 filed on Jan. 19, 2012.

BACKGROUND OF THE INVENTION (1) Field of the Invention

This invention relates to novel synthesized base resins and methods for their manufacture. This invention also relates to compositions used to manufacture laminates where the compositions include commercially available raw resins or a synthesized base resin of this invention as an ingredient. This invention further includes prepregs and laminates manufactured using the compositions of this invention where the laminates are particularly useful in the manufacture of printed circuit boards. The compositions of this invention produce prepregs and laminates that possess excellent electrical performance suitable for high frequency application in electronics, as well as excellent thermal and mechanical performance.

(2) Description of the Art

With operating frequencies of electronic devices ever increasing, the dielectric constant (DK) and dielectric dissipation factor (DF) of the resin substrate used in the printed circuit boards associated with the electronic devices is becoming more important. The lead-free technology in soldering process driven by tighter and tighter environment restriction also requires better thermal stability of the resin substrate. Traditional thermosetting resin systems like phenolic resins and epoxy resins are beginning to show the limitations when incorporated into high dielectric constant and/or high dielectric dissipation factor electronic substrates.

Resins useful in the manufacture of printed circuit boards are disclosed, for example in the following U.S. Pat. Nos. 5,218,030, 5,223,568, 5,571,609, 6,306,963, 6,352,783, 6,617,398 and 7,090,924. Some of the listed patents disclose technology which can produce low DF materials but usually has low Tg and high thermal expansion (although may not be mentioned in the patent). This kind of materials can be used only on double sided or only few layers laminates for high frequency application, like antennas. Some patents disclose technology that can produce a material with high Tg, while their DF is not low enough for very high frequency application. Others disclose technologies that are useful in preparing good final performance products but cannot be used to make dry B-stage glass prepreg for most PCB manufacturers.

The trend of the electronics industry requires materials not only with low DK and DF for high frequency application, but also good mechanical and thermal properties for multilayer board application. High Tg, low thermal expansion and good thermal stability are primary importance for multilayer board application. Therefore, a need continues to exist for thermosetting resin compositions that are useful in manufacturing prepregs and laminates with excellent electrical performance for high frequency application while retaining desirable thermal and mechanical performance like high Tg, low CTE, high thermal stability, as well as low process temperature and being able to make non-sticky, non-tacky B-stage prepreg for conventional multi-layer board fabrication.

SUMMARY OF THE INVENTION

The present invention is directed to synthesized base resins, compounded varnishes made with synthesized base resins or with commercially available raw resins and prepregs and laminates made from the compounded varnishes.

One aspect of this invention is a varnish composition comprising from about 1 to about 99% by dry weight of a base resin selected from a raw resin, a synthesized base resin and combinations thereof; a monomer of mono maleimide, bismaleimide or a combination of mono maleimide and bismaleimide monomers; a flame retardant; and an initiator.

In another aspect, this invention includes a varnish composition including a raw resin wherein the raw resin is a synthesized base resin that is the product of the synthesis of an admixture of ingredients comprising: an unsaturated polyolefin polymer; and at least one monomer of a mono maleimide, a bismaleimide and combinations thereof.

Still another aspect of this invention is A method of preparing a synthesized base resin by the steps of: admixing in the presence of a solvent, an unsaturated polyolefin polymer and at least one monomer of a mono maleimide, a bismaleimide and combinations thereof; adding an initiator to the admixture to form a reactive mixture; heating the reactive mixture at a temperature of from about 90 to about 105° C. and allowing the reactive mixture to react until the viscosity of the reactive mixture ranges from about 300-1000 cP measured at 25° C.; and adding an inhibitor to the reactive mixture to stop the reaction.

A further aspect of this invention is a synthesized base resin composition comprising: (a) about 1 to 99%, preferably 30 to 70% by weight of copolymer with carbon-carbon double bond, including polybutadiene, polyisoprene, copolymer of butadiene and styrenic monomer like styrene, bromo-styrene, dibromostyrene or divinylbenzene, or triblock copolymer of butadiene, styrene and divinylbenzene. It includes polymers which are in liquid state or solid state at room temperature, preferably a solid polymer at room temperature; (b) from 1 to 50% and preferably from about 5 to about 35% by dry weight of a monomer of a maleimide with at least one, preferably two or more maleimide groups wherein the maleimide is selected from the group which includes N-phenyl-maleimide; N-phenyl-methylmaleimide; N-phenyl-chloromaleimide; N-p-chlorophenyl-maleimide; N-p-methoxyphenyl-maleimide; N-p-methylphenyl-maleimide; N-p-nitrophenyl-maleimide; N-p-phenoxyphenyl-maleimide; N-p-phenylaminophenyl-maleimide; N-p-phenoxycarbonylphenyl-maleimide; 1-maleimido-4-acetoxysuccinimido-benzene; 4-maleimido-4'-acetoxysuccinimido-diphenylmethane; 4-maleimido-4'-acetoxysuccinimido-diphenyl ether; 4-maleimido-4'-acetamido-diphenyl ether; 2-maleimido-6-acetamido-pyridine; 4-maleimido-4'-acetamido-diphenylmethane and N-p-phenylcarbonylphenyl-maleimideN-ethylmaleimide, N-2.6-xylylmaleimide, N-cyclohexylmaleimide, N-2,3-xylylmaleimide, xylyl maleimide, 2,6-xylenemaleimide, 4,4'-bismaleimidodiphenylmethane and combinations thereof; and optionally one or more of (c) initiators, such as peroxides, flame retardants to make it flame resistant and filler.

Another aspect of this invention is a synthesized base resin composition comprising: (a) about 1 to 99%, preferably 30 to 70% by weight of copolymer with carbon-carbon double bond, including polybutadiene, polyisoprene, copolymer of butadiene and styrenic monomer like styrene, bromo-styrene, dibromostyrene or divinylbenzene, or triblock copolymer of butadiene, styrene and divinylbenzene. It includes polymers which are in liquid state or solid state at room temperature, preferably a solid polymer at room temperature; (b) from about 1 to about 50% and preferably from about 5 to about 35% by dry weight of a monomer of maleimide with at least one, preferably two or more maleimide group selected from the group including N-phenyl-maleimide; N-phenyl-methylmaleimide; N-phenyl-chloromaleimide; N-p-chlorophenyl-maleimide; N-p-methoxyphenyl-maleimide; N-p-methylphenyl-maleimide; N-p-nitrophenyl-maleimide; N-p-phenoxyphenyl-maleimide; N-p-phenylaminophenyl-maleimide; N-p-phenoxycarbonylphenyl-maleimide; 1-maleimido-4-acetoxysuccinimido-benzene; 4-maleimido-4'-acetoxysuccinimido-diphenylmethane; 4-maleimido-4'-acetoxysuccinimido-diphenyl ether; 4-maleimido-4'-acetamido-diphenyl ether; 2-maleimido-6-acetamido-pyridine; 4-maleimido-4'-acetamido-diphenylmethane and N-p-phenylcarbonylphenyl-maleimideN-ethylmaleimide, N-2.6-xylylmaleimide, N-cyclohexylmaleimide, N-2,3-xylylmaleimide, xylyl maleimide, 2,6-xylenemaleimide, 4,4'-bismaleimidodiphenylmethane and combinations thereof; and optionally one or more of (c) initiators, such as peroxides, flame retardants to make it flame resistant and filler wherein said copolymer of carbon-carbon double bond polymer can be synthesized by this invention with a composition comprising:

(1) a base carbon-carbon double bond copolymer such as butadiene-styrene or alike
(2) a brominated styrenic monomer, such as dibromostyrene
(3) initiator such as peroxide
(4) solvent composition comprising DMF of toluene, where DMF is from 5 to 50%, more preferable 20 to 40%.

Yet another aspect of this invention is a synthesized base resin composition comprising: (a) about 1 to 99%, preferably 30 to 70% by weight of copolymer with carbon-carbon double bond, including polybutadiene, polyisoprene, copolymer of butadiene and styrenic monomer like styrene, bromostyrene, dibromostyrene or divinylbenzene, or triblock copolymer of butadiene, styrene and divinylbenzene. It includes polymers which are in liquid state or solid state at room temperature, preferably a solid polymer at room temperature; (b) from about 1 to about 50% and preferably from about 5 to about 35% by dry weight of a monomer of maleimide with at least one, preferably two or more maleimide groups, selected from the group which includes N-phenyl-maleimide; N-phenyl-methylmaleimide; N-phenyl-chloromaleimide; N-p-chlorophenyl-maleimide; N-p-methoxyphenyl-maleimide; N-p-methylphenyl-maleimide; N-p-nitrophenyl-maleimide; N-p-phenoxyphenyl-maleimide; N-p-phenylaminophenyl-maleimide; N-p-phenoxycarbonylphenyl-maleimide; 1-maleimido-4-acetoxysuccinimido-benzene; 4-maleimido-4'-acetoxysuccinimido-diphenylmethane; 4-maleimido-4'-acetoxysuccinimido-diphenyl ether; 4-maleimido-4'-acetamido-diphenyl ether; 2-maleimido-6-acetamido-pyridine; 4-maleimido-4'-acetamido-diphenylmethane and N-p-phenylcarbonylphenyl-maleimideN-ethylmaleimide, N-2.6-xylylmaleimide, N-cyclohexylmaleimide, N-2,3-xylylmaleimide, xylyl maleimide, 2,6-xylenemaleimide, 4,4'-bismaleimidodiphenylmethane and combinations thereof; and optionally one or more of (c) initiators, such as peroxides, flame retardants to render it flame retardant and a filler wherein the copolymer of carbon-carbon double bond polymer can be synthesized by this invention with a composition comprising:

1) a base carbon-carbon double bond copolymer such as butadiene-styrene or the like;
2) brominated styrenic monomer, such as dibromostyrene;
3) a mono maleimide such as 2,6-xylenemaleimide, in the range of 1 to 50 parts per 100 parts of base resin, preferably 5 to 30 parts;
4) at least one initiator such as peroxide; and
5) a solvent composition comprising DMF of toluene, where DMF is from 5 to 50%, more preferable 20 to 40%.

Yet another aspect of this invention is a synthesized base resin composition comprising: (a) about 1 to 99%, preferably 30 to 70% by weight of copolymer with carbon-carbon double bond, including polybutadiene, polyisoprene, copolymer of butadiene and styrenic monomer like styrene, bromostyrene, dibromostyrene or divinylbenzene, or triblock copolymer of butadiene, styrene and divinylbenzene. It includes polymers which are in liquid state or solid state at room temperature, preferably a solid polymer at room temperature; (b) from about 1 to about 50% and preferably from about 5 to about 35% by dry weight of a monomer of maleimide with at least one, preferably two or more maleimide groups, selected from the group which includes N-phenyl-maleimide; N-phenyl-methylmaleimide; N-phenyl-chloromaleimide; N-p-chlorophenyl-maleimide; N-p-methoxyphenyl-maleimide; N-p-methylphenyl-maleimide; N-p-nitrophenyl-maleimide; N-p-phenoxyphenyl-maleimide; N-p-phenylaminophenyl-maleimide; N-p-phenoxycarbonylphenyl-maleimide; 1-maleimido-4-acetoxysuccinimido-benzene; 4-maleimido-4'-acetoxysuccinimido-diphenylmethane; 4-maleimido-4'-acetoxysuccinimido-diphenyl ether; 4-maleimido-4'-acetamido-diphenyl ether; 2-maleimido-6-acetamido-pyridine; 4-maleimido-4'-acetamido-diphenylmethane and N-p-phenylcarbonylphenyl-maleimideN-ethylmaleimide, N-2.6-xylylmaleimide, N-cyclohexylmaleimide, N-2,3-xylylmaleimide, xylyl maleimide, 2,6-xylenemaleimide, 4,4'-bismaleimidodiphenylmethane and combinations thereof; and optionally one or more of (c) initiators, such as peroxides, flame retardants to make it flame resistant and filler wherein the copolymer of carbon-carbon double bond polymer can be synthesized by this invention with a composition comprising:

1). a base carbon-carbon double bond copolymer such as butadiene-styrene or the like;
2) a brominated styrenic monomer, such as dibromostyrene;
3) a mono maleimide such as 2,6-xylenemaleimide, in the range of 1 to 50 parts per 100 parts of base resin, preferably 3 to 30 parts;
4) an adhesion promoter monomer such as mono-functional or di-functional methacrylates of urethane;
5) an initiator such as peroxide; and
6) a solvent and preferably a composition comprising DMF and/or toluene, where the DMF is present in the solvent in an amount ranging from 5 to 50%, more preferably 20 to 40%.

A still further aspect of this invention is a synthesized base resin composition comprising: (a) about 1 to 99%, preferably 30 to 70% by weight of copolymer with carbon-carbon double bond, including polybutadiene, polyisoprene, copolymer of butadiene and styrenic monomer like styrene, bromostyrene, dibromostyrene or divinylbenzene, or triblock copolymer of butadiene, styrene and divinylbenzene. It includes polymers which are in liquid state or solid state at room temperature, preferably a solid polymer at room temperature; (b) from about 1 to about 50% and preferably from about 5 to about 35% by dry weight of a monomer of maleimide with at least one, preferably two or more maleimide groups, selected from the group which includes N-phenyl-maleimide; N-phenyl-methylmaleimide; N-phenyl-chloromaleimide; N-p-chlorophenyl-maleimide; N-p-methoxyphenyl-maleimide; N-p-methylphenyl-maleimide; N-p-nitrophenyl-maleimide; N-p-phenoxyphenyl-maleimide; N-p-phenylaminophenyl-maleimide; N-p-phenoxycarbonylphenyl-maleimide; 1-maleimido-4-acetoxysuccinimido-benzene; 4-maleimido-4'-acetoxysuccinimido-diphenyl-methane; 4-maleimido-4'-acetoxysuccinimido-diphenyl ether; 4-maleimido-4'-acetamido-diphenyl ether; 2-maleimido-6-acetamido-pyridine; 4-maleimido-4'-acetamido-diphenylmethane and N-p-phenylcarbonylphenyl-maleimideN-ethylmaleimide, N-2.6-xylylmaleimide, N-cyclohexylmaleimide, N-2,3-xylylmaleimide, xylyl maleimide, 2,6-xylenemaleimide, 4,4'-bismaleimidodiphenyl-methane and combinations thereof; and optionally one or more of (c) initiators, such as peroxides, flame retardants to make it flame resistant and filler wherein the resins discussed in the paragraphs immediately above are synthesized by the steps of:

1. dissolving peroxide in toluene and DMF and mixing with the base polymer as described in the three immediately preceding paragraphs;
2. dissolving peroxide and the mono maleimide in toluene and DMF, and mixing with DBS;
3. heating the first solution of (i) to 90 to 100° C., and then adding the solution made in (ii) preferably over several hours.

DESCRIPTION OF CURRENT EMBODIMENTS

This invention is directed generally to synthesized base resin compositions, base resin synthesis methods, varnishes made from a plurality of ingredients including at least one raw resin or synthesized base resin as well as to prepregs and laminates made using the varnishes of this invention.

This invention includes varnishes that have at least one resin selected from a commercially available raw resin (CARR) a specially synthesized base resin (SYNR) of this invention or a combination of both. The SYNR of this invention will further include, among its ingredients, at least one commercially available raw resin. Varnishes of this invention are made by a "compounding" process where a CARR or SYNR or both is/are combined with other ingredients to form a thermosetting varnish. The varnish is then used to manufacture a laminate. The varnish can be used to manufacture a laminate by "impregnating" a core material such as a woven glass fabric with the varnish. Alternatively, the varnish can be used to coat a copper sheet to form a resin coated copper laminate or the varnish can be used to form a laminate sheet that does not have a core material. The laminates made from the varnishes of this invention are useful as a prepreg—i.e., partially cured or "b-stage" form—and in a completely cured "c-stage" form. The ingredients used to formulate the synthesized base resin and/or the varnishes of this invention are discussed in more detail below. Unless stated otherwise, the synthesized base resin composition ingredient weight percent ranges and varnish ingredient weight percent ranges are reported on a dry or solvent free basis.

Synthesized Base Resins

The synthesized base resins (SYNRs) of this invention will include a commercially available raw resin and at least one unsaturated monomer selected from mono maleimide and/or bismaleimide. The SYNR may include one or more optional ingredients such as one or more reactive monomers, one or more brominated monomers, adhesion promoters, styrene, one or more initiators as well as other optional ingredients discussed below.

In one embodiment, this invention is directed to synthesized SYNRs. The SYNRs of this invention and/or CARRs each in combination with effective crosslinkers, such as one or more mono maleimides and/or bismaleimides, can be used to make varnishes that are useful in the manufacture of dielectric substrates (prepregs and laminates) having high Tg, low DK, low DF, and low thermal expansion. Prepregs made with such varnishes are non-sticky and can be used in dry-layup process for most of the printed circuit board manufacturers.

(1) Raw Resins

SYNR's of this invention as well as some of the varnishes of this invention will include a commercially available raw resin ingredient. The CARR may be any unsaturated polyolefin polymer known in the art as being useful to prepare varnishes for use in manufacturing printed circuit board laminates. The term "unsaturated polyolefin polymer" includes homopolymers of dienes, or copolymers (including triblock copolymers) of different alkenes and/or dienes. The unsaturated polyolefin resin will also include one or more than one carbon-carbon double bond (R1C=CR2), where R1 and R2 can be hydrogen, halogen or other known groups such as aryl, $C_{1-15}$ alkyl, halo, $NO_2$, $CF_3$, CN, $C_{2-15}$ alkenyl, $C_{2-15}$ alkynyl, heterocyclyl, aryl, and heteroaryl, wherein the alkyl, alkenyl, alkynyl, aryl, heterocyclyl and heteroaryl substituents are may optionally be substituted with from 1 to 3 substituents. Some examples of useful unsaturated polyolefin polymers include, but are not limited to polybutadiene, polyisoprene, butadiene-styrene copolymers, isoprene-styrene copolymers, tri-block copolymers of butadiene-styrene-methacrylate, butadiene-styrene-divinylbenzene, butadiene-styrene-acrylonitrile copolymer, butadiene-styrene-maleic anhydride copolymer and any combination thereof.

Useful raw resins can be purchased from commercial suppliers and include, but are not limited to Ricon 100, Ricon 134, Ricon 154, Ricon 184, and Ricon 250 all manufactured by Cray Valley USA LLC, 468 Thomas Jones Way, Suite 100, Exton, Pa.; Sartomer CD535-DicycloPentadienyl, Sartomer SR602-Ethoxylated Bisphenol A Diacrylate Methacrylate, Sartomer SR368-Tris(2-Hydroxyl Ethyl) Isocyanurate Triacrylate, Sartomer SR295-PentaErythritol Tetraacrylate, Sartomer CD580-Alkoxylated Cyclohexane Dimethanol Diacrylate, Sartomer CD262-1,12 Dodecanediol Dimethacrylate, Sartomer 9020-Propoxylated Glyceral Triacrylate, Sartomer SR454-Ethoxylated Trimethylolpropane Triacrylate, Sartomer SR9011-Trifunctional Methacrylate Ester, Sartomer CD-614-Alkoxylated Nonylphenol Acrylate all manufactured by Sartomer Co., Exton Pa.

The unsaturated polyolefin polymer useful in this invention include polymers which are in liquid state or solid state at room temperature and preferably those that are in a solid polymer at room temperature.

CARRs useful in SYNR synthesis include unsaturated resins of the type that would be used for low DK and low DF dielectric substrates such as a polybutadiene polymer, or the copolymer of butadiene with styrene or the like styrenic monomers. Although these kinds of CARRs possess ideal electrical performance, their mechanical performance usually is poor, such as low modulus, low Tg, high thermal expansion and low adhesion to copper foil etc. These CARRs are also usually sticky at room temperature, unless they have a very high molecular weight. The stickiness makes it very hard to manufacture non-sticky B-stage prepreg for dry-layup process. However, overcoming the stickiness problem by starting with very high molecular weight CARRs can create other problems such as poor resin flowability, which is an issue in PCB fabrication.

In general, the CARR's used to synthesize a SYNR will have an average molecular weight less than that of the CARR's used directly in compounding a varnish. The CARR used to prepare a SYNR will have an average molecular weight of from about 1000 to about 5000. In contrast, the CARR used directly in compounding a varnish will typically have an average molecular weight of from about 5000 to about 10000 or more.

The CARR resin may be present in the SYNR in an amount ranging from about 1 to about 99 wt %, or from about 30 to about 70 wt % by dry weight.

One or more CARRs or SYNRs may be present in the varnishes of the invention in an amount ranging from about 30 to about 80 wt %, or from about 40 to about 70 wt % on a dry basis.

(2) Mono Maleimide/Bismaleimide

The SYNRs and the varnishes of this invention may each include at least one of a mono maleimide and/or bismaleimide monomer and combinations thereof. The one or more mono maleimide and/or bismaleimide monomers are added to the CARR compositions during synthesis of SYNRs of this invention to aid in the formation of a cured resin product having a high Tg. Adding one or more mono maleimide and/or bismaleimide monomers to the varnishes of this invention may also enhance crosslinking density of the resulting resin and thereby reduce thermal expansion, improve laminate stability and increase laminate Tg.

Useful mono maleimide monomers include those having the formula:

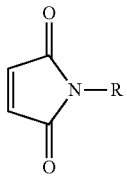

where R is alkyl, cyclic alkyl, aryl, substituted aryl groups and includes maleimide monomers such as N-phenyl-maleimide; N-phenyl-methylmaleimide; N-phenyl-chloromaleimide; N-p-chlorophenyl-maleimide; N-p-methoxyphenyl-maleimide; N-p-methylphenyl-maleimide; N-p-nitrophenyl-maleimide; N-p-phenoxyphenyl-maleimide; N-p-phenylaminophenyl-maleimide; N-p-phenoxycarbonylphenyl-maleimide; 1-maleimido-4-acetoxysuccinimido-benzene; 4-maleimido-4'-acetoxysuccinimido-diphenylmethane; 4-maleimido-4'-acetoxysuccinimido-diphenyl ether; 4-maleimido-4'-acetamido-diphenyl ether; 2-maleimido-6-acetamido-pyridine; 4-maleimido-4'-acetamido-diphenylmethane and N-p-phenylcarbonylphenyl-maleimideN-ethylmaleimide, N-2.6-xylylmaleimide, N-cyclohexylmaleimide, N-2,3-xylylmaleimide, xylyl maleimide, 2,6-xylenemaleimide and combinations thereof.

Bismaleimide monomers (BMI), useful in the present invention will generally be those monomers having the formula:

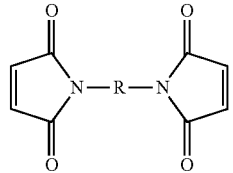

where R can be alkyl, aryl, mixed alkyl-aryl hydrocarbons, or one or more maleimide unit. Non-limiting examples of useful bismaleimide monomers include N,N'-ethylene-bis-maleimide; N,N'-hexamethylene-bis-maleimide; N,N'-meta-phenylene-bis-maleimide; N,N'-para-phenylene-bis-maleimide; N,N'-4,4'-biphenylene-bis-maleimide; N,N'-4,4'-diphenylmethane-bis-maleimide; N,N'-4,4'-(diphenyl ether)-bis-maleimide; N,N'-4,4'-(diphenyl sulfide)-bis-maleimide; N,N'-m-phenylenebismaleimide, 4,4'-diphenylmethanebismaleimide, N,N'-(4-methyl-m-phenylene)-bismaleimide, polyphenylmethanebismaleimide; N,N'-4,4'-diphenylsulfone-bis-maleimide; N,N'-4,4'-dicyclohexylmethane-bis-maleimide; N,N'-.alpha.,.alpha.'-4,4'-dimethylenecyclohexane-bis-maleimide; N,N'-meta-xylylene-bis-maleimide; N,N'-para-xylylene-bis-maleimide; N,N'-4,4'-(1,1-diphenylcyclohexane)-bis-maleimide; N,N'-4,4'-diphenylmethane-bis-chloromaleimide; N,N'-4,4'-(1,1-diphenylpropane)-bis-maleimide; N,N'-4,4'-(1,1,1-triphenylethane)-bis-maleimide; N,N'-4,4'-triphenylmethane-bis-maleimide; N,N'-3,5-triazole-1,2,4-bis-maleimide; N,N'-dodecamethylene-bis-maleimide; N,N'-(2,2,4-trimethylhexamethylene)-bis-maleimide; N,N'-4,4'-diphenylmethane-bis-citraconimide; 1,2-bis-(2-maleimidoethoxy)-ethane; 1,3-bis-(3-maleimidopropoxy)-propane; N,N'-4,4'-benzophenone-bis-maleimide; N,N'-pyridine-2,6-diyl-bis-maleimide; N,N'-naphthylene-1,5-bis-maleimide; N,N'-cyclohexylene-1,4-bis-maleimide; N,N'-5-methylphenylene-1,3-bis-maleimide or N,N'-5-methoxyphenylene-1,3-bis-maleimide. These bisimides can be prepared by utilizing methods described in, for example, U.S. Pat. No. 3,018,290 the specification of which is incorporated herein by reference. Most of the BMI are powder at room temperature, with limited solubility in organic solvents. They can be dispersed in the solution very well.

The SYNR's of this invention may include from about 1 to 50 wt % or from about 5 to 35 wt % by weight of at least one monomer of mono maleimide, bismaleimide or combinations thereof on a dry basis. As with the CARR, if a maleimide monomer is used in the SYNR synthesis, then the monomer will typically be a single functional or mono maleimide monomer. In contrast, the monomer used in compounding a varnish will typically be a bismaleimide monomer or combination thereof.

The compounded varnishes of this invention will typically include from about 1 to about 30 wt % or from about 5 to about 20 wt % on a dry basis of at least one of a maleimide monomer, bismaleimide monomer or combinations thereof with bismaleimide monomers being preferred.

(3) The Flame Retardant

The compounded varnishes of this invention may include one or more flame retardants. Any flame retardant that is known to be useful in resin compositions used to manufacture composites and laminates use to manufacture printed circuit boards may be used. The flame retardants may contain halogens or they may be halogen free. Examples of useful flame retardants include, but are not limited to, halides of glycidyl etherified bifunctional alcohols, halides of novolac resins such as bisphenol A, bisphenol F, polyvinylphenol or phenol, creosol, alkylphenol, catecohl, and novolac resins such as bisphenol F, inorganic flame retardants such as antimony trioxide, red phosphorus, zirconium hydroxide, barium metaborate, aluminum hydroxide, and magnesium hydroxide, and phosphor flame retardants such as tetraphenyl phosphine, tricresyldiphenyl phosphate, triethylphosphate, cresyldiphenylphosphate, xylenyl-diphenyl phosphate, acid phosphate esters, ammonia phosphate, ammonia polyphosphate, ammonia cyanurate, phosphate compounds containing nitrogen, and phosphate esters containing halides.

The phosphorous flame retardants may include, for example, OP 930 manufactured by Clariant Corp., Charlotte, N.C., 9,10-Dihydro-9-oxa-10phosphaphenanthrene-10-oxide DOPO) having the following formula:

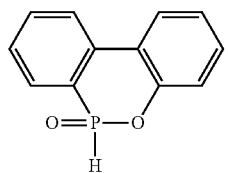 [SMILES: O=[PH]1Oc2ccccc2-c2ccccc21]

and derivatives thereof such as:

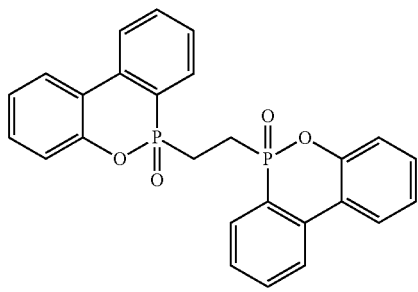 [SMILES: O=P1(CCP2(=O)Oc3ccccc3-c3ccccc32)Oc2ccccc2-c2ccccc21]

Flame retardants will be present in the resin compositions of this invention in an amount sufficient to allow laminates made from the resin compositions to pass the UL-94 flammability test.

In one embodiment, the resin compositions of this invention will include high bromine content insoluble materials that disperse and that do not substantially dissolve in the varnish. By high bromine content we mean a compound having bromine content by weight of at least 40 wt % or more and preferably at least 60 wt % or more. One useful high bromine content solid flame retardant is decabromodiphenylethane, which has the following structure:

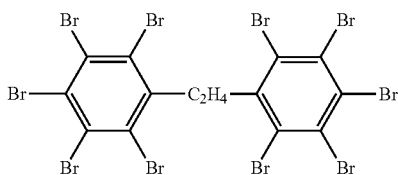

Decabromodiphenylethane is commercially available, for example, from Albemarle Corporation (451 Florida St., Baton Rouge, La. 70801). The Albemarle product is sold as Saytex™ 8010. Decabromodiphenylethane also unexpectedly improves the dielectric properties of the cured resin composition. As a result, decabromodiphenylethane can be included in the resin compositions in amounts far greater than is necessary for a flame retardant in order to also enhance the dielectric properties of the cured resin. Another useful high bromine content insoluble flame retardant is ethylenebistetrabromophthalimide which is sold as Saytex BT93W by Albemarle Corporation. Other similar useful flame retardants include decabromodiphenyl oxide and brominated polystyrene.

A flame retardants or combinations thereof may be present in the varnish in an amount ranging from about 5% to about 50%, or from about 20% to about 45% on 100 a dry weight basis.

When the flame retardant is a one or more brominated compounds, then they may be present in the varnish in an amount sufficient to provide a total bromine content to the composition of about 8 to about 30 wt %, preferably about 10 to about 20 wt %, based on 100% by dry weight of solids in the resin composition. When a phosphorous-based flame retardant is used, the phosphorous-based flame retardant may be present in the varnish in an amount sufficient to provide from 3 to 10% phosphorous and preferably from 2 to 7 wt % phosphorous in the varnish.

(4) Initiators/Catalysts

Either peroxide or azo-type polymerization initiators (catalysts) can be used in the resin compositions to perform a variant of functions such as encouraging homopolymerization, crosslinking of the SYNR synthesis or varnish ingredients and to be available during varnish thermosetting to enhance the rate of resin cure. The initiators/catalysts chosen may be any compound that is known to be useful in resin synthesis or curing whether or not it performs one of these functions.

On example of useful initiators are peroxide compounds. Suitable peroxide initiators include, for example benzoyl peroxide (BPO) and dicumyl peroxide (dicup) 2,5-Dimethyl-2, 5-di-t-butylperoxyhexyne (DYBP), and 2,5-Dimethyl-2,5-di-t-butylperoxyhexane. Another class of useful initiators is azo-type initiators such as azobisisobutyronitrile (AIBN).

The amount of initiator used depends upon its application. In SYNR synthesis, the initiator will be present in an amount ranging from about 0.5 to about 2.0 wt %. When used in a varnish, the initiator will be present in an amount ranging from about 1.0 to about 3.0 wt %.

(5) Solvents

One or more solvents are typically incorporated into the resin compositions of this invention in order to solubilize the appropriate resin composition ingredients, and or to control resin viscosity, and/or in order to maintain the resin ingredients in a suspended dispersion. Any solvent known by one of skill in the art to be useful in conjunction with thermosetting resin systems can be used. Particularly useful solvents include methylethylketone (MEK), toluene, dimethylformamide (DMF), or mixtures thereof.

When used, solvents are present in the SYNR's and/or compounded varnish in an amount of from about 20% to about 50% as a weight percentage of the total weight of the composition. In one SYNR embodiment, DMF is used as part of the solvent because it keeps the resin solution clear and homogeneous. However DMF is not needed as a solvent if a maleimide monomer is used during SYNR synthesis.

(6) Optional Ingredients (a) Reactive Monomers

The SYNR's and varnish compositions of this invention may include one or more optional reactive monomer. In the case of the SYNRs, the optional reactive monomer would actually be the second reactive monomer as the mono maleimide and/or bismaleimide monomer discussed above would also be considered a reactive monomer. The optional reactive monomer(s) may be any monomer that contains one or more carbon-carbon double bonds that can react with the unsaturated polyolefin resin. Suitable chemical reactivity is the first consideration. Examples of useful reactive monomers include styrenic monomers such as styrene, bromo-styrene, dibromostyrene, divinylbenzene, pentabromobenzyl acrylate, trivinylcyclohexane, triallyl isocyanurate, triallyl cyanurate, triacrylate isocyanurate and combinations thereof.

In some case, if the reactive monomer includes bromine, the reactive monomer can be used as a portion to all of the composition flame retardant. The reactive monomer(s), if used, will typically be present in the synthesized based resin composition in an amount ranging from about greater than 0 to about 40 wt %, or from about 10 to about 35 wt % and more narrowly from about 20 to about 35 wt %.

The optional reactive monomer(s), depending on their chemical structure, can reduce the stickiness of the SYNR resin and/or increase the crosslinking density of the final product. For example, when styrene monomer is added during SYNR synthesis in an amount ranging from 5 to 10% by weight of the solvent free resin ingredients, it can reduce the stickiness of the SYNR. Other monomers with multi-functionality can improve the crosslinking density of the final product.

In some cases, one or more optional reactive monomers can be added to the varnish during compounding. The optional reactive monomers may be added to the varnish for a variety of reasons including, but not limited to reducing prepreg stickiness and improving product properties such as dimensional stability, and so forth. Optional reactive monomers can be included in the varnish during compounding in an amount ranging from greater than 0 to about 40 wt % or from about 5 to about 30 wt %

(b) Fillers

One or more fillers can optionally be added to the resin compositions of this invention to improve chemical and electrical properties of the cured resin. Examples of properties that can be modified with fillers include, but are not limited to, coefficient of thermal expansion, increasing modulus, and reducing prepreg tack. Non-limiting examples of useful fillers include particulate forms of Teflon®, Rayton®, talc, quartz, ceramics, particulate metal oxides such as silica, titanium dioxide, alumina, ceria, clay, boron nitride, wollastonite, particulate rubber, PPO/PolyPhenylene Oxide and mixtures thereof. Preferred fillers include calcined clay, fused silica and combinations thereof. Yet other preferred fillers are silane treated silica and reclassified silica. When used, fillers are present in the compounded varnish of this invention in an amount from greater than 0% to about 40 wt %, preferably from greater than 0 to about 20 wt %, based on 100% by weight solids of the composition.

(c) Tougheners

The thermosetting resin compositions of this invention may include one or more tougheners. The tougheners are added to the resin compositions to improve the drillability of the resulting composites and laminates. Useful tougheners include methyl methacrylate/butadiene/styrene copolymer, methacrylate butadiene styrene core shell particles, and mixtures thereof. A preferred toughener is methacrylate butadiene styrene core shell particles, which is available from Rohm & Haas (100 Independence Mall West, Philadelphia, Pa.), sold under the trade name Paraloid®. When used, tougheners are present in the thermosetting resin compositions of this invention in an amount from about 1% to about 5%, preferably from about 2 to about 4%, based on 100% by weight solids of the composition.

(d) Adhesion Promoters

To improve the adhesion of the resin to copper foil, other optional monomers can be added into the synthesis or into the varnish during compounding. Such monomers are unsaturated functional monomers including those containing urethane, amino or urea groups such as:

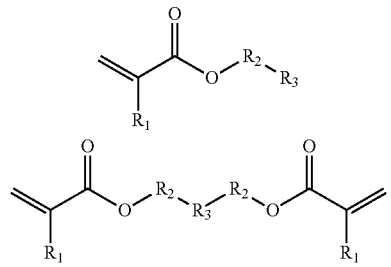

where $R_1$ can be H or $C_1$ to $C_3$ alkyl group, $R_2$ can be $C_1$ to $C_4$ alkyl group and $R_3$ can be one or more urethane group, amino group or urea group, such as diurethane dimethacrylate, dimethylaminoethyl methacrylate or methacrylamide, etc.

If adhesion promoters are incorporated into the SYNR during synthesis, then they will be present in an amount ranging from about 1 to about 20 wt % and more narrowly for about 5 to about 10 wt % on a dry basis. If adhesion promoters are incorporated into the compounded varnish, then they will be present in an amount ranging from about 1 to about 20 wt % and more narrowly for about 5 to about 10 wt % on a dry basis (e) Polyphenylene ether (PPE)

Polyphenylene ether (or polyphenylene oxide) can be optionally used during SYNR synthesis or during varnish compounding. Polyphenylene ether has the following formula:

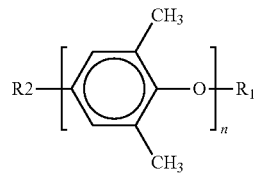

where R1 and R2 can be hydrogen, methacrylate or acrylate group. When the molecular weight of PPE is lower than 5000, it can be directly added into the varnish at room temperature. When PPE molecular weight is higher than 5000, the varnish must be heated to 50° C. or higher to dissolve it. Adding PPE into the composition can increase Tg and reduce the resin flammability.

PPE will typically be included in a SYNR in an amount ranging from about 5 to about 20 wt %. PPE may be present as an ingredient of a compounded varnish in an amount ranging from about 10 to about 50 wt %

(f) Other Optional Ingredients

Optionally, the compounded varnish may also contain other additives such as defoaming agents, leveling agents, dyes, and pigments. For example, a fluorescent dye can be added to the resin composition in a trace amount to cause a laminate prepared therefrom to fluoresce when exposed to UV light in a board shop's optical inspection equipment. A useful fluorescent dye is a highly conjugated diene dye. One example of such a dye is UVITEX® OB (2,5-thiophenediyl-bis(5-tert-butyl-1,3-benzoxazole), available from Ciba Specialty Chemicals, Tarrytown, N.Y.

Other optional ingredients known by persons of skill in the art to be useful in resins that are used to manufacture printed circuit board laminates may also be included in the resin compositions of this invention.

Synthesized Base Resins (SYNR's)

The SYNRs of this invention, in combination with effective crosslinkers, such as mono maleimides and/or bismaleimides, can be used to make varnishes that are useful in the manufacture of dielectric substrates (prepregs and laminates) having high Tg, low DK, low DF, and low thermal expansion. Prepregs made with such varnishes are non-sticky and can be used in dry-layup process for most of the printed circuit board manufacturers.

A first ingredient of the SYNRs of this invention are CARRs. Useful CARRs are discussed above and include unsaturated polyolefin resin of the type that would be used for low DK and low DF dielectric substrates such as a polybutadiene polymer, or the copolymer of butadiene with styrene or the like styrenic monomers. Although these raw resins possesses ideal electrical performance, their mechanical performance usually is poor, such as low modulus, low Tg, high thermal expansion and low adhesion to copper foil etc. These raw resins are also usually sticky at room temperature, unless they have a very high molecular weight or high content of styrene. The stickiness makes it very hard to manufacture non-sticky B-stage prepreg for dry-layup process. However, overcoming the stickiness problem by starting with very high molecular weight raw resins can create other problems such as poor varnish flowability, which is an issue in PCB fabrication. Peroxide can initiate the crosslinking but the improvement in mechanical performance is limited. The capped polyphenylene ether (PPE) disclosed in U.S. Pat. No. 5,218,030 (the specification of which is incorporated herein by reference) can reduce the stickiness, increase Tg and modulus, but it is not sufficiently enough to reduce thermal expansion.

A second useful ingredient for SYNRs is at least one mono maleimide and/or bismaleimide (BMI) monomer. BMI has a low solubility in most of the organic solvents commonly used in PCB fabrication. So the crosslinking density can be limited due to nonhomogeneous reaction. We have found that dimethylformamide (DMF) is the best solvent for BMI. However most of the unsaturated polymer ingredients are incompatible with DMF. Increasing the amount of DMF will cause the unsaturated polymer to phase out.

Another problem with the aforementioned compositions is that a large amount of flame retardant must be added to make it V-0 compliant. A typical flame retardant for this kind of polymer is an insoluble powder. However, when a powdered flame retardant is used, the resulting resin often has a high filler loading which is generally not desirable in PCB fabrication.

One of our solutions to this problem is to add soluble halogenated reactive monomers as a flame retardants. The reactive monomer will combine with the aforementioned unsaturated polyolefin polymers in the reactive mixture during SYNR synthesis and thereby become part of the SYNR. Reactive monomers that include bromine are especially useful monomers for this purpose. However, some reactive monomers when added directly into the varnish during compounding will eventually vaporize during the laminate manufacturing process in the treater at normal treating temperatures. There can also be health and safety issues created by adding high levels of bromine containing reactive monomers directly into the composition during varnish compounding and prepreg treating due to their toxicity. Therefore, to avoid these problems, bromine containing volatile reactive monomers can be added to the CARR during SYNR synthesis and grafted onto the polyolefin backbone to form a bromine containing SYNR.

The following are SYNR synthesis methods that solve one or more of the above problems. SYNR synthesis begins with a commercially available unsaturated polyolefin polymer (raw resin) such as polybutadiene or polyisoprene polymer, or a copolymer of butadiene or isoprene with styrene, with average molecular weight of the CARR used in base resin synthesis will range from 1000 to 10,000, and more preferably from 4000~6000. For a copolymer, the desirable content of styrene is 5~50% by weight, more preferable from 30~40% by weight of the copolymer. The polymer preferably contains 1,2-vinyl and more than about 50% and preferably more than about 70%, by mole percent of butadiene unit. In one embodiment, the styrene unit is in the backbone of the molecular chain. Many useful CARRs are very viscous and sticky at room temperature. One way that the stickiness can be reduced or eliminated is by using a resin including 40% or more by weight of styrene in the molecular backbone.

One or more optional reactive monomers with carbon-carbon double bond can be selectively added to the resin system during its synthesis. The monomers, depending on their chemical structure, can reduce the stickiness of the SYNR, or increase the crosslinking density of the final product. For example, when styrene monomer is added in synthesis in an amount ranging from 5 to 10% by weight of the solvent free resin ingredients, it can reduce the stickiness of the resulting SYNR. Other monomers with multi-functionality can improve the crosslinking density of the final product.

In another embodiment, a monomer of mono maleimide and or bismaleimide can be added to the synthesis mixture to aid in the formation of a cured resin product having a high Tg. Preferably mono maleimides are added to the admixture during SYNR synthesis.

The selection of solvent can be important in resin synthesis. Many solvents can dissolve unsaturated polymers and monomers. However, with polymerization advancing during resin synthesis, a milky solution may form or precipitation may occur if the solvent composition is not appropriate. A possible reason for this is that DBS is very reactive and has a tendency to homopolymerize. The homopolymer of DBS, while soluble in toluene, demonstrates a tendency to form a milky solution or precipitate when mixed with an unsaturated polyolefin polymer even in the presence of toluene. We have overcome this problem by using solvent systems that include dimethylformamide (DMF) in the synthesis. The useful amount of DMF can vary from 0 to 50% by weight of the solvent, more preferably from 20 to 40% weight of the solvent with the remaining solvent being selected from benzene, toluene or xylene. In this range, the synthesized resin solution is clearly homogeneous.

To improve the adhesion of the resin to copper foil, adhesion promoters of the kind discussed above can be added into the synthesis or during varnish compounding. However, when certain adhesion promoters such as diurethane dimethacrylate is added directly into the varnish during compounding with an unsaturated polymer and other components to make a prepreg, the prepreg can be sticky such that it cannot be used in dry-layup process. When diurethane dimethacrylate is added during base resin synthesis, it reacts with the unsaturated polymer and thus significantly reduces the resin stickiness. Indeed, copper clad laminates prepared using varnishes containing this SYNR have peel strengths 0.5 to 1.0 lb/in higher than without diurethane dimethacrylate.

Either peroxide or azo type polymerization initiators can be used in this synthesis. Peroxide is preferred only because there are more commercial product options. In one embodiment, the initiator is benzoyl peroxide (BPO). The laminates of this invention can be made from resins of this invention that include from 0.1 to about 4.0 and preferably about 0.2 to 2.0 parts per 100 parts of SYNR by weight.

The resin synthesis temperature is another factor in enhancing resin and resulting prepreg and laminate properties. High synthesis temperature facilitates crosslinking reactions and thus tends to produce undesirably high resin viscosity or, in some cases, resin gelation. Low temperature facilitates the homopolymerization of DBS. We have determined that an optimal synthesis temperature range is 90 to 105° C.

An embodiment of a SYNR synthesis procedure is discussed below. Although all components can be added into a reactor, start heating up for the polymerization, reaction temperature is not easy to control particularly in large volume production. On the other hand, this method doesn't facilitate the grafting of monomer onto the polyolefin molecule backbone. Instead, it facilitates homopolymerization. A preferred synthesis procedure is as follows:

(1) Add the raw polyolefin resin, solvents and peroxide into a reactor with agitator and reflux condenser to form a first synthesis component. Purge the reactor with nitrogen. Heat the reactor slowly to the desired temperature to avoid overheat;

(2) Prepare a second solution by mixing a reactive bromine containing monomer, a monomer of a mono maleimide or both, solvents and peroxide in second container to form a second composition. Add the second composition into the reactor dropwise over several hours at the set temperature;

(3) After step 2 is complete, continue the heat the reactor for a period of time sufficient, for example, for the reaction admixture to meet the desired viscosity endpoint such as 300-1000 cP at 25° C.

(4) Once the mixture in the reactor meets the desired endpoint synthesis is complete. To stop the reaction, a free-radical inhibitor is added to the reactor to stop the reaction polymerization. Many chemicals in phenolic category can be used as inhibitor. In one embodiment, the inhibitor is 2,6-di-tert-butyl-4-methyl-phenol (also called t-butyl-hydroxy toluene (BHT).

We have discovered adding styrene to SYNRs improves (reduces) the stickiness of varnishes made using the SYNRs of this invention. In addition, we have discovered that incorporating both a mono maleimide and a bromine containing reactive monomer in a single or two step synthesis significantly improves the Tg of laminates made from varnishes including the SYNR will maintaining other laminate properties such as peel strength and z-direction expansion. We have further discovered that that removing DMF as a solvent during SYNR synthesis appears to improve the resulting laminate peel strength without significantly impacting other important laminate properties. Finally, we have discovered that an adhesion promoter can be successfully added to the SYNR as opposed to adding the adhesion promoter during varnish compounding.

Varnish Compounding

The SNYRs synthesized by the method immediately above or by any base resin synthesis methods of this invention can be compounded into a varnish by optionally combining the SYNR with one or more flame retardants, cured by BMI, catalyzed with peroxide and thereafter b-staged or c-staged in order to form a dielectric substrate with good dielectric performance, excellent thermal stability, low thermal expansion, acceptable adhesion to copper foil, while the resin impregnated woven glass prepreg is non-sticky, suitable for dry-layup PCB fabrication process. For example, its glass laminate with 54% resin content has a DK of 3.30, DF 0.0035, DMA Tg greater than 180° C., solder float longer than 1000 seconds, 5 lb/in peel strength.

As mentioned above, commercially available polyolefin raw resins can be used to make low DK low DF laminate for printed circuit boards. When these polyolefin resins are directly cured by peroxide alone, the laminate performance is poor, such as low Tg and high thermal expansion.

We have discovered that adding one or more monomers of mono maleimide, bismaleimide or combinations thereof to a SYNR or CARR significantly improves the resulting laminate Tg without sacrificing other laminate properties such as DK, DF, peel strength and z-direction expansion. Therefore, in one of the embodiment of this invention, the varnish is made by compounding a CARR, SYNR or a combination thereof with a monomer of mono maleimide or bismaleimide and preferably one or more bismaleimide monomers (BMI). BMI is an effective crosslinker for rubber and polybutadiene or the like polymers. Thus, one example of a compounded varnish that includes a resin composition using commercially available polyolefin resin (CARR), useful for manufacturing dielectric substrates for PCB may include:

(a) CARR
(b) A BMI crosslinker;
(c) Flame retardant such as decabromodiphenylethane or halogen free flame retardants.
(d) A peroxide initiator
(e) Solvents Such a resin composition when partially cured at 130 to 160° C. to B-stage is non-sticky and possesses suitable flowability for PCB fabrication. The resin composition impregnated woven glass laminate made with this composition usually has a Tg by DMA (dynamic mechanical analysis) 110~120° C. and Z-direction thermal expansion less than 5% at 50 to 250° C., depending on the resin content. This compares to a 80~90° C. Tg and 6 to 7% expansion of a woven glass laminate impregnated with the same resin composition but without the BMI ingredient.

Prepregs and Laminates

The varnishes described above and/or manufactured with SYNRs, CARRs or both are useful for preparing prepregs and/or laminates used in the manufacture of printed circuit boards. In order to be useful in manufacturing printed circuit boards the laminates can be partially cured or b-staged in which state they can be laid up with additional material sheets to form a c-staged or fully cured laminate sheet. Alternatively, the resins can be manufactured into c-staged or fully cured material sheets.

In one useful processing system, the resin compositions of this invention are useful for making prepregs in a batch or in a continuous process. Prepregs are generally manufactured using a core material such as a roll of woven glass web (fabric) which is unwound into a series of drive rolls. The web then passes into a coating area where the web is passed through a tank which contains the thermosetting resin system of this invention, solvent and other components where the glass web becomes saturated with the resin. The saturated glass web is then passed through a pair of metering rolls which remove excess resin from the saturated glass web and thereafter, the resin coated web travels the length of a drying tower for a selected period of time until the solvent is evaporated from the web. A second and subsequent coating of resin can be applied to the web by repeating these steps until the preparation of the prepreg is complete whereupon the prepreg is wound onto roll The woven glass web can replaced with a woven fabric material, paper, plastic sheets, felt, and/or particulate materials such as glass fiber particles or particulate materials.

In another process for manufacturing prepreg or laminate materials, thermosetting resins of this invention are premixed in a mixing vessel under ambient temperature and pressure. The viscosity of the pre-mix is ~600-1000 cps and can be adjusted by adding or removing solvent from the resin. Fabric substrate (typically but not limited to E glass) is pulled through a dip tank including the premixed resin, through an oven tower where excess solvent is driven off and the prepreg is rolled or sheeted to size, layed up between Cu foil in various constructions depending on glass weave style, resin content & thickness requirements.

The thermosetting resin mix can also be applied in a thin layer to a Cu foil substrate (RCC—resin coated Cu) using slot-die or other related coating techniques.

The resins, prepregs and resin coated copper foil sheets described above can be used to make laminates in batch or in continuous processes. In exemplary continuous process for manufacturing laminates of this invention, a continuous sheet in the form of each of copper, a resin prepreg and a thin fabric sheet are continuously unwound into a series of drive rolls to form a layered web of fabric, adjacent to the resin prepreg sheet which is adjacent to a copper foil sheet such that the prepreg sheet lies between the copper foil sheet and the fabric sheet The web is then subjected to heat and pressure conditions for a time that is sufficient to cause the resin to migrate into the fabric material and to completely cure the resin. In the resulting laminate, the migration of the resin material into the fabric causes the thickness of the resin layer (the distance between the copper foil material and the fabric sheet material to diminish and approach zero as combination layers discussed above transforms from a web of three layers into a single laminate sheet. In an alternative to this method, a single prepreg resin sheet can be applied to one side of the fabric material layer and the combination sandwiched between two copper layers after which heat and/or pressure is applied to the layup to cause the resin material to flow and thoroughly impregnate the fabric layer and cause both copper foil layers to adhere to the central laminate.

In still another embodiment, the resin coated copper sheets can be made at the same time the laminate is being made by applying a thin coating of resin to two different continuously moving copper sheets, removing any excess resin from the sheets to control the resin thickness and then partially curing the resin under heat and/or pressure conditions to form a sheet of b-staged resin coated copper. The sheet(s) of b-staged resin coated copper can then be used directly in the laminate manufacturing process.

In yet another embodiment, the fabric material—with or without prior pretreatment—can be continuously fed into a resin bath such that the fabric material becomes impregnated with the resin. The resin can be optionally partially cured at this stage in the process. Next, one or two copper foil layers can be associated with the first and/or second planar surface of the resin impregnated fabric sheet to form a web after which heat and/or pressure is applied to the web to fully cure the resin.

What is claimed is:

1. A method of preparing a synthesized base resin by the steps of:
    admixing in the presence of a solvent, from about 1 to about 99 wt % of at least one unsaturated polyolefin polymer and from about 1 to about 50 wt % of at least one monomer of a mono maleimide, a bismaleimide and combinations thereof;
    adding an initiator to the admixture to form a reactive mixture;
    heating the reactive mixture to a temperature of from about 90 to about 105° C. and allowing the reactive mixture to react for a period of time sufficient for the reactive mixture to reach a viscosity of from about 300-1000 cP measured at 25° C.; and
    adding an inhibitor to the reactive mixture to stop the reaction wherein the admixture does not include a polyphenylene ether.

2. The method of claim 1 wherein the solvent includes dimethylformamide in an amount ranging from greater that 0 to about 50% of the weight the base co-polymer admixture.

3. The method of claim 1 wherein the solvent includes dimethylformamide and toluene.

4. The method of claim 1 wherein the unsaturated polyolefin polymer has a molecular weight of from about 1000 to about 5000.

5. The method of claim 1 wherein the at least one monomer of a mono maleimide, a bismaleimide and combinations thereof is a mono maleimide monomer.

6. The method of claim 1 wherein the synthesized base resin includes from about 30 to about 70 wt % of an unsaturated polyolefin polymer and from about 5 to about 35 wt % of the at least one mono maleimide monomer.

7. The method of claim 1 wherein the admixture further includes a reactive monomer.

8. The method of claim 7 wherein the reactive monomer is at least one styrenic monomer.

9. The method of claim 7 wherein the reactive monomer is a soluble halogenated monomer.

10. The method of claim 1 wherein the admixture includes an adhesion promoter.

11. The method of claim 10 wherein the adhesion promoter is one or more di-functional methacrylates of urethane.

12. The method of claim 1 wherein the at least one monomer of a mono maleimide, a bismaleimide and combinations thereof is selected from the group consisting of N-phenyl-maleimide; N-phenyl-methylmaleimide; N-phenyl-chloro-maleimide; N-p-chlorophenyl-maleimide; N-p-methoxyphenyl-maleimide; N-p-methylphenyl-maleimide; N-p-nitrophenyl-maleimide; N-p-phenoxyphenyl-maleimide; N-p-phenylaminophenyl-maleimide; N-p-phenoxycarbonylphenyl-maleimide; 1-maleimido-4-acetoxysuccinimido-benzene; 4-maleimido-4'-acetoxysuccinimido-diphenyl-methane; 4-maleimido-4'-acetoxysuccinimido-diphenyl ether; 4-maleimido-4'-acetamido-diphenyl ether; 2-maleimido-6-acetamido-pyridine; 4-maleimido-4'-acetamido-diphenylmethane N-p-phenylcarbonylphenyl-maleimide; N-ethylmaleimide; N-2.6-xylylmaleimide; N-cyclohexyl-maleimide; N-2,3-xylylmaleimide; xylyl maleimide, 2,6-xylenemaleimide; 4,4'-bismaleimidodiphenylmethane and combinations thereof.

13. A method of preparing a synthesized base resin comprising the steps of:
    admixing in the presence of a solvent, from about 1 to about 99 wt % of at least one unsaturated polyolefin polymer, from about 1 to about 50 wt % of at least one monomer of a mono maleimide, a bismaleimide and combinations thereof and a reactive monomer;
    adding an initiator to the admixture to form a reactive mixture;
    heating the reactive mixture to a temperature of from about 90 to about 105° C. and allowing the reactive mixture to react for a period of time sufficient for the reactive mixture to reach a viscosity of from about 300-1000 cP measured at 25° C.; and adding an inhibitor to the reactive mixture to stop the reaction wherein the admixture further includes a reactive monomer, wherein the reactive monomer is a soluble halogenated monomer, and wherein the soluble halogenated monomer is dibromostyrene.

14. The method of claim 13 wherein the admixture is formed by the further steps of:
   i. combining the at least one unsaturated polyolefin polymer, at least on solvent and an initiator to form a first solution;
   ii. preparing a second solution by mixing the at least one monomer of a mono maleimide, a bismaleimide and combinations thereof and the reactive monomer; and
   iii. adding the second solution into the first solution over several hours.

15. A method of preparing a synthesized base resin comprising the steps of:
   admixing in the presence of a solvent, from about 1 to about 99 wt % of a copolymer of butadiene-styrene and from about 1 to about 50 wt % of at least one monomer of a mono maleimide, a bismaleimide and combinations thereof;
   adding an initiator to the admixture to form a reactive mixture;
   heating the reactive mixture to a temperature of from about 90 to about 105° C. and allowing the reactive mixture to react for a period of time sufficient for the reactive mixture to reach a viscosity of from about 300-1000 cP measured at 25° C.; and adding an inhibitor to the reactive mixture to stop the reaction.

16. A method of preparing a synthesized base resin by the steps of:
   admixing in the presence of a solvent, from about 30 to about 70 wt % of an unsaturated polyolefin polymer that is selected from the group consisting of polyisoprene, copolymers of butadiene and styrenic monomers and combinations thereof and from about 5 to about 35 wt % of at least one monomer of a mono maleimide that is selected from the group consisting of N-phenyl-maleimide; N-phenyl-methylmaleimide; N-phenyl-chloro-maleimide; N-p-chlorophenyl-maleimide; N-p-methoxyphenyl-maleimide; N-p-methylphenyl-maleimide; N-p-nitrophenyl-maleimide; N-p-phenoxyphenyl-maleimide; N-p-phenylaminophenyl-maleimide; N-p-phenoxycarbonylphenyl-maleimide; 1-maleimido-4-acetoxysuccinimido-benzene; 4-maleimido-4'-acetoxysuccinimido-diphenylmethane; 4-maleimido-4'-acetoxysuccinimido-diphenyl ether; 4-maleimido-4'-acetamido-diphenyl ether; 2-maleimido-6-acetamido-pyridine; 4-maleimido-4'-acetamido-diphenylmethane and N-p-phenylcarbonylphenyl-maleimide; N-ethylmaleimide; N-2.6-xylylmaleimide, N-cyclohexylmaleimide; N-2,3-xylylmaleimide; xylyl maleimide; 2,6-xylenemaleimide or combinations thereof;
   adding an initiator to the admixture to form a reactive mixture;
   heating the reactive mixture to a temperature of from about 90 to about 105° C. for a time sufficient to allow the reactive mixture to react a viscosity of from about 300-1000 cP measured at 25° C.; and
   adding an inhibitor to the reactive mixture to stop the reaction.

17. The method of claim 16 wherein the admixture is made by the further steps of:
   preparing a first solution including the unsaturated polyolefin polymer;
   preparing a second solution including the at least one monomer of a mono maleimide and at least one reactive monomer; and
   combining the first solution and second solution to form the admixture.

18. The method of claim 17 wherein the at least one reactive monomer is a soluble halogenated monomer.

19. The method of claim 18 wherein the soluble halogenated monomer is dibromostyrene, pentabromobenzyl acrylate and combinations thereof.

20. The method of claim 17 wherein a reactive monomer is added to the first solution.

21. The method of claim 16 wherein the admixture includes an adhesion promoter.

* * * * *